United States Patent [19]
DeRees et al.

[11] Patent Number: 5,709,426
[45] Date of Patent: Jan. 20, 1998

[54] MOTOR VEHICLE BODY

[75] Inventors: Delbert D. DeRees, Romeo; Del C. Schroeder, Bloomfield Hills, both of Mich.

[73] Assignee: Chrysler Corporation, Auburn Hills, Mich.

[21] Appl. No.: 546,433

[22] Filed: Oct. 20, 1995

[51] Int. Cl.[6] ................ B62D 29/04; B60J 7/08
[52] U.S. Cl. .............. 296/185; 296/76; 296/135; 296/146.14; 296/219; 296/901
[58] Field of Search ............ 296/216, 219, 296/901, 76, 135, 138, 140, 141, 143, 145, 146.14, 185, 186

[56] References Cited

U.S. PATENT DOCUMENTS

| 1,883,739 | 10/1932 | Ford | 296/219 |
| 3,596,979 | 8/1971 | Hablitzel et al. | 296/901 X |
| 3,819,227 | 6/1974 | Carli | 296/219 |
| 4,521,049 | 6/1985 | Genma et al. | 296/185 |

*Primary Examiner*—Andrew C. Pike
*Attorney, Agent, or Firm*—Margaret A. Dobrowitsky

[57] ABSTRACT

A convertible canvas top for an automobile having opposed molded plastic sides includes a top portion having a plurality of transversely oriented roof bows sewn into it and a trunk lid portion which depends downwardly from the top portion. The top portion is rollably engaged with the sides of the body for movement between an up configuration, wherein the top portion is taut throughout its length and extends between the sides of the body to cover the passenger compartment, and a down configuration, wherein the top portion is furled to expose the passenger compartment from above the automobile. Likewise, the trunk lid portion is rollably engaged with the plastic body for movement between an open configuration, wherein a rear edge of the trunk lid portion is raised to expose the passenger compartment from the rear, and a closed configuration, wherein the rear edge of the trunk lid portion is lowered such that the trunk lid portion covers the rear of the passenger compartment.

7 Claims, 2 Drawing Sheets

MOTOR VEHICLE BODY

RELATED APPLICATIONS

This patent application is related to commonly-assigned U.S. patent application Ser. No. 08/540,297: for an invention entitled "FOUR PIECE INJECTION MOLDED PLASTIC AUTOMOBILE BODY".

FIELD OF THE INVENTION

The present invention relates generally to automobiles, and more particularly to lightweight convertible tops for lightweight automobiles.

BACKGROUND OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of which can be minimized by minimizing the weight of the automobile and by using the novel structure disclosed herein.

More specifically, the present invention recognizes that the cost of an automobile can be minimized by minimizing the weight of the automobile. The cost of a lightweight automobile is relatively low because, among other things, a lightweight automobile can be propelled by a relatively small, fuel-efficient motor. Additionally, certain lightweight materials happen to be inexpensive, and easy to manufacture.

As further recognized by the present invention, it is advantageous to further reduce the weight of such an automobile by providing an effective and lightweight roof or top. As recognized herein, making the roof or top of lightweight material would reduce the overall weight and, hence, cost of the automobile.

Additionally, the present invention recognizes that such a lightweight top embody pleasing features, and in particular that it be a convertible top to enable a user of the automobile to drive with the top down during pleasant weather. Such a top must be adequately structurally supported while it is up, however, and must be provided with an effective locking system, for security reasons.

OBJECTS OF THE INVENTION

Accordingly, it is an object of the present invention to provide a lightweight top for an automobile which is convertible. Another object of the present invention is to provide a lightweight roof or top for an automobile which is strong and which is adequately supported. Yet another object of the present invention is to provide a lightweight roof for an automobile that is easy to use and cost-effective to manufacture.

SUMMARY OF THE INVENTION

A lightweight convertible top cover is disclosed for an automobile that includes a body having opposed lightweight sides establishing a passenger compartment therebetween. In accordance with the present invention, the automobile defines a longitudinal axis and a transverse axis, end the top cover includes a canvas top portion. Per the present invention, the top portion is movable between an up configuration, wherein the top portion is taut throughout its length and extends between the sides of the body to cover the passenger compartment, and a down configuration, wherein the top portion is furled to expose the passenger compartment.

Additionally, the top cover includes a plurality of transversely oriented roof bows which are coupled to the top portion and which are supported by the sides of the automobile when the top portion is in the up configuration. Further, the top cover includes a trunk lid portion including a rear edge. As described in greater detail below, the trunk lid portion depends downwardly from the top portion and is engaged with the body for movement between an open configuration, wherein the rear edge of the trunk lid portion is closely spaced from the top portion and the passenger compartment is exposed, and a closed configuration, wherein the rear edge of the trunk lid portion is distanced from the top portion and the trunk lid portion covers the passenger compartment.

In a presently preferred embodiment, the trunk lid portion includes a plastic translucent or transparent rear window. The trunk lid portion can be furled to establish the open configuration. In this preferred embodiment, the body of the automobile includes a transversely-oriented roof support, and the top portion is affixed to the roof support. Also, a plurality of manipulable pull straps are attached to the top portion for grasping the pull straps to move the top portion to the up configuration. These pull straps can be manipulated to hold the top portion in the down configuration.

As intended by the present inventive principles discussed below, each roof bow defines respective opposed left and right ends. The body further includes at least one left roof bow support surface for supporting the left end of at least one of the roof bows and at least one right roof bow support surface for supporting the right end of at least one of the roof bows.

Left and right lips respectively extend outwardly from the left and right sides of the automobile, and the top portion defines left and right edges. The top portion further includes left and right cords respectively engaged with the left and right edges for tautly holding edges in engagement with the respective lips.

In another aspect of the present invention, an automobile which defines a longitudinal axis and a transverse axis includes a plastic body having opposed sides establishing a passenger compartment therebetween. The automobile also includes a convertible automobile top engaged with the body for selectively positioning the top above the passenger compartment. The top is movable between an up configuration, wherein the top is taut throughout its length and extends between the sides of the body to cover the passenger compartment, and a down configuration, wherein the top is longitudinally furled to expose the passenger compartment from above the automobile.

In still another aspect, a method is disclosed for covering an automobile including a body having opposed molded plastic sides establishing a passenger compartment therebetween and defining a longitudinal axis and a transverse axis. The body includes a transversely-oriented roof support, left and right lips respectively extending outwardly from the left and right sides of the automobile, and left and right roof bow support surfaces.

Per the present method, a canvas top portion is provided which has a plurality of transversely-oriented roof bows attached thereto. This top portion defines left and right edges and includes left and right cords respectively engaged with the left and right edges. The method contemplates positioning at least end portions of the roof bows on the left and right roof bow support surfaces. Further, the present method contemplates affixing a portion of the top portion to the roof support, and then engaging the top portion with the lips such that the left and right edges of the top portion are tautly held in respective engagement with the left and right lips. With this methodology, the top portion is movable between an up configuration, wherein the top portion is taut and extends between the sides of the body to cover the passenger compartment, and a down configuration, wherein the top portion is furled to expose the passenger compartment from above the automobile.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
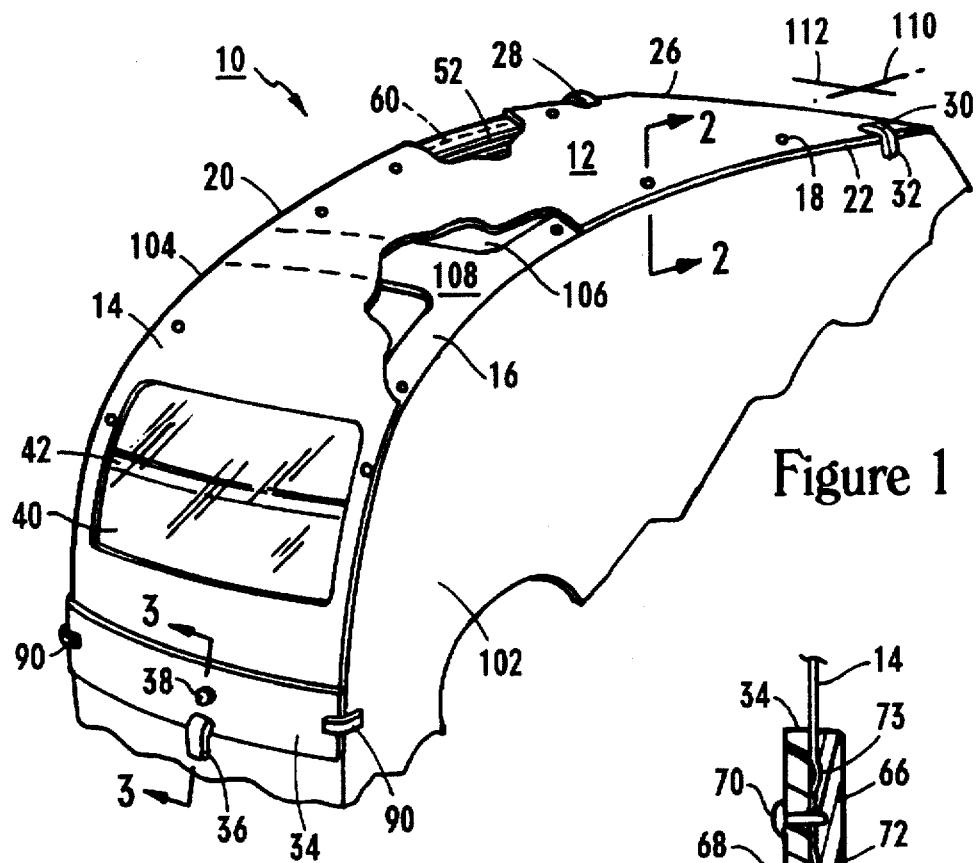
FIG. 1 is a perspective view of the canvas top engaged with an automobile, with the top portion in the up configuration and the trunk lid portion in the closed configuration, with portions of the automobile cut away and portions shown in phantom.

Referring initially to FIG. 1, a lightweight, cloth fabric, preferably canvas, automobile top, generally designated 10, is shown engaged with an automobile, generally designated 100, for selectively covering the passenger compartment of the automobile 100. In the presently preferred embodiment, the automobile 100 includes an injection-molded plastic body having opposed lightweight sides 102, 104 which establish a passenger compartment 106 therebetween. A flat transverse cross member 108, shown in phantom in FIG. 1, extends between the sides 102, 104 and is connected thereto. Per the present invention, the automobile defines a longitudinal axis 110 and a transverse axis 112. The details of the automobile 100 are disclosed in the above-referenced patent application.

As shown in FIG. 1, the canvas top 10 includes a top portion 12, a trunk lid portion 14 depending downwardly from the top portion 12, and a fixed strip portion 16 between the top portion 12 and trunk lid portion 14. As intended by the present invention, the fixed strip portion 16 is bonded, screwed, or otherwise affixed to the cross member 108.

Additionally, the canvas top 10 includes a plurality of fasteners 18 disposed along left and right edges 20, 22 of the canvas top 10. As more fully disclosed below, the left and right, edges 20, 22 are hollow end welts. In accordance with the present invention, each fastener 18 is engaged with a complementarily configured fastener 24 (best shown in FIG. 2) that is affixed to the body of the automobile 100. In the presently preferred embodiment, the fasteners 18 are snap fasteners.

FIG. 1 further shows that the canvas top 10 defines a front edge 26. Opposed elastic loop straps 28, 30 are sewn to the canvas top 10 and can be manipulated to stretch the top portion 12 of the top 10 to the up configuration shown in FIG. 1. Then, the straps 28, 30 can be engaged with a front ridge 32 of the automobile 100 as shown to hold the top portion 12 in the up configuration.

In contrast to the top portion 12, the trunk lid portion 14 includes a rigid plastic lower boot 34 that is connected to the fabric of the top 10 as more fully disclosed below in reference to FIG. 3. An over-center latch 36 is attached to the boot 34 and is selectively engageable with the automobile 100 to hold the trunk lid portion 14 taut in the closed configuration shown in FIG. 1. If desired, a key-operated cylinder lock 38 can be installed on the boot 34 for engaging the lock 38 with a latch (not shown) on the automobile 100, to lock the boot 34 onto the automobile 100.

In further contrast to the top portion 12, the trunk lid portion 14 includes a transparent, preferably glazed, flexible plastic rear window 40 which is sewn to the fabric of the trunk lid portion 14. A transverse window bow 42 is attached to the window 40 for supporting the window 40.

Figure 2:
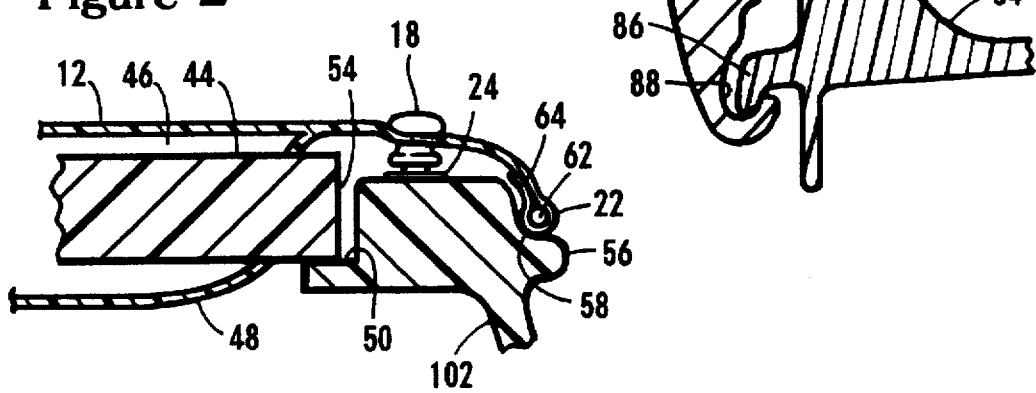
FIG. 2 is a cross-sectional view of the top portion of the canvas top, as seen along the line 2—2 in FIG. 1.

Now referring to FIG. 2 the details of the top portion 12 can be seen. As can be appreciated in reference to FIG. 2, the top portion 12 includes a plurality of transversely oriented, flexible, elongated hard plastic roof bows 44. Each roof bow 44 is disposed in a respective pocket 46 that is established by a respective pocket strip 48. In turn, each pocket strip 48 is sewn to the top portion 12.

A right roof bow support surface 50 is formed in the right side 102 of the body of the automobile 100. As shown, the right roof bow support surface 50 is essentially a ledge that extends transversely inwardly from the right side 102, and that extends longitudinally along the top edge of the right side 102. Referring briefly back to FIG. 1, a left roof bow support surface 52 (shown in phantom), which is in all substantial respects identical in configuration to the right roof bow support surface 50, is formed in the left side 104 of the body of the automobile 100. In accordance with the present invention, the left and right roof bow support surfaces 52, 50 support respective left and right ends 54 of the roof bows 44.

In continued reference to FIG. 2, a right lip 56 is formed in the right side 102 of the body of the automobile 100. As shown, the right lip 56 extends downwardly and transversely outwardly from the right side 102 to establish a trough 58, and the right lip extends longitudinally along the top edge of the right side 102. Referring briefly back to FIG. 1, a left lip 60 (shown in phantom), which is in all substantial respects identical in configuration to the right lip 56, is formed in the left side 104 of the body of the automobile 100.

Per the present invention a flexible cord 62 is disposed in an end welt channel 64 that is defined by the right edge 22 of the canvas top 10. A cord (not shown) is likewise disposed in the left edge 20 of the top 10. With this combination of structure, the edges 20, 22 can be positioned in their respective troughs, and the fasteners 18 snappingly engaged with their respective fasteners 24 on the automobile 100, to tautly hold the top portion 12 in the up configuration shown in FIG. 1.

Figure 3:
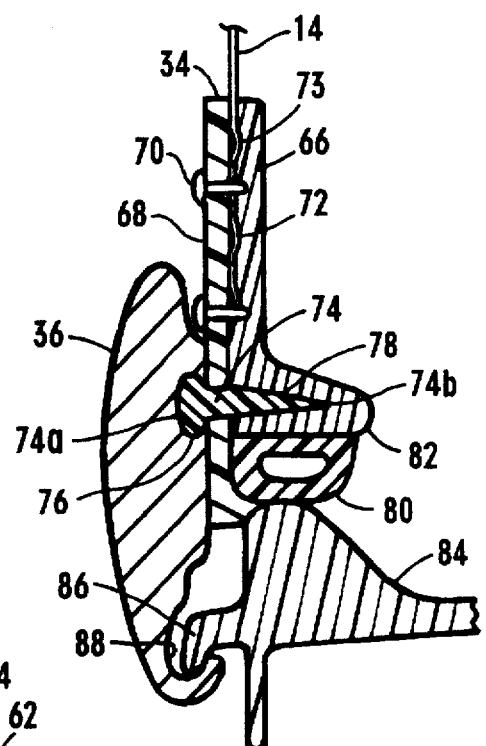
FIG. 3 is a cross-sectional view of the trunk lid portion of the canvas top, as seen along the line 3—3 in FIG. 1.

FIG. 3 shows the details of the boot 34. As shown, the boot 34 includes a transversely oriented hard rigid plastic front plate 66 and a transversely oriented hard rigid plastic rear plate 68 positioned flush against the front plate 66. A plurality of fasteners, e.g., rivets 70, hold the plates 66, 68 together.

As shown, the front plate 66 is formed with a plurality of transversely oriented trapper channels 72 which face the rear plate 68. With this structure, a rear edge portion 73 of the fabric of the trunk lid portion 14 can be sandwiched between the plates 66, 68 and the plates 66, 68 then fastened together to trap the fabric between the plates 66, 68.

FIG. 3 shows that the over-center latch 36 is resiliently attached to the boot 34. More particularly, in the presently preferred embodiment a head 74a of a generally nail-shaped resilient rubber or plastic connector 74 is disposed in a receptacle 76 of the latch 36 and a shaft 74b of the connector 74 extends through the rear plate 68 and is closely received in a receptacle 78 of the front plate 66.

A hollow resilient seal 80 is sandwiched between a bottom flange 82 of the front plate 66 and a rear transverse cross member 84 of the body of the automobile 100. Additionally, a retainer lip 86 is formed on the rear cross member 84 and extends longitudinally rearwardly therefrom. As shown in FIG. 3, the latch 34 is formed with a lower notch 88 for engaging the retainer lip 86.

Accordingly, it may now be appreciated that the latch 34 can be pulled downwardly to engage its lower notch 88 with the retainer lip 86 and thereby hold the trunk lid portion 14 in the closed configuration shown in FIGS. 1 and 3. In the closed configuration shown, the rear edge 73 is distanced from the top portion 12 and the trunk lid portion 14 covers the passenger compartment 106.

Owing to the resiliency of the connector 74, however, the lower notch 88 of the latch 34 can be manually disengaged from the retainer lip by pulling the latch downwardly and rearwardly from the lip 86. With the launch 34 disengaged, the fasteners 18 of the trunk lid portion 14 can be unsnapped from their respective fasteners 24 on the body of the automobile 100, and the trunk lid portion 14 furled (i.e., rolled) into an open configuration, shown in FIG. 4. To hold the trunk lid portion 14 in the open configuration, elastic straps 90 are attached to the trunk lid portion 14 and are engageable with the body of the automobile 100, as shown best in FIG. 4. It is to be understood that as shown in FIG. 4, in the open configuration, the rear edge 73 of the trunk lid portion 14 is closely spaced from the top portion 12, and the passenger compartment 106 is exposed from the rear of the automobile 100.

Figure 4:
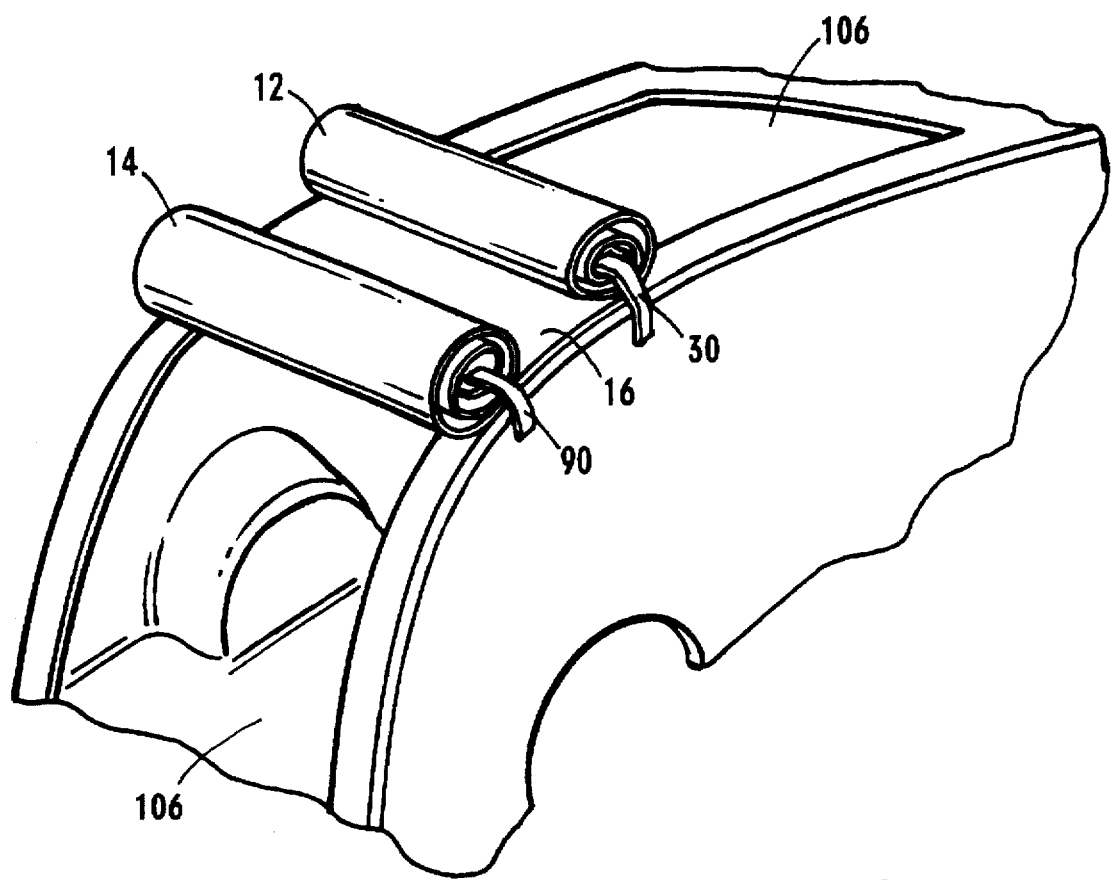
FIG. 4 is a perspective view of the canvas top engaged with an automobile, with the top portion furled in the down configuration and the trunk lid portion furled in the closed configuration, with portions of the automobile cut away.

With the above disclosure in mind and in reference to FIGS. 1 and 4, it may now be further appreciated that the top portion 12 is movable to an up configuration (FIG. 1), wherein the top portion 12 is taut throughout its length and extends between the sides 102, 104 of the body of the automobile 100 to cover the passenger compartment 106. In the up configuration, the fasteners 18, 24 are snappingly engaged with each other, the edges 20, 22 of the top portion 12 are positioned in their respective troughs, and the straps 28, 30 are engaged with the front ridge 32.

Moreover, the top portion 12 is movable to a down configuration shown in FIG. 4, wherein the top portion 12 is furled, i.e., is rolled up, to expose the passenger compartment 106 from above. To move the top portion 12 to the down configuration, the straps 28, 30 are disengaged from the front 32, the fasteners 18, 24 are unsnapped from each other, and the top portion is manually rolled to the furled configuration shown in FIG. 4. Then, the straps 28, 30 can be stretched and engaged with the automobile 100 to hold the top portion in the down configuration, as can be appreciated referring to FIG. 4.

In addition to uncovering the passenger compartment 106 from above as described, the passenger compartment 106 may also be uncovered from the rear by furling (i.e., by rolling) the trunk lid portion 14 from the closed configuration shown in FIG. 1 to an open configuration shown in FIG. 4, as described above.

While the particular CANVAS TOP WITH INTEGRAL ROOF BOWS FOR LIGHTWEIGHT AUTOMOBILES as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claim. For example, one or both of the portions 12, 14, instead of being rollably engaged with the automobile 100, may be slidably engaged therewith, and assume a pleated configuration when in the respective down and open configurations.

We claim:

1. An automobile defining a longitudinal axis and a transverse axis, the automobile comprising:

a plastic body having opposed sides establishing a passenger compartment therebetween; and a convertible automobile top engaged with the body for selectively positioning the top above the passenger compartment, the top being movable between an up configuration, wherein the top is taut throughout a length thereof and extends, between the sides of the body to cover the passenger compartment, and a down configuration, wherein the top is longitudinally furled to expose the passenger compartment from above the automobile, the top including:

a top portion positioned above the passenger compartment, at least one transversely oriented roof bow being sewn to the top portion and supported by the sides of the automobile when the top is in the up configuration; and a trunk lid portion including a rear edge, the trunk lid portion depending downwardly from the top portion behind the passenger compartment and being engaged with the body for movement between an open configuration, wherein the rear edge of the trunk lid portion is raised and the passenger compartment is exposed from a rear of the automobile, and a closed configuration, wherein the rear edge of the trunk lid portion is lowered and the trunk lid portion covers the passenger compartment.

2. The automobile of claim 1, wherein the trunk lid portion includes a plastic translucent or transparent rear window.

3. The automobile of claim 2, the body of the automobile includes a transversely-oriented roof support, and the top portion is affixed to the roof support.

4. The automobile of claim 3, further comprising a plurality of manipulable pull straps attached to the top portion for grasping the pull straps to move the top to the up configuration.

5. The automobile of claim 4, wherein the pull straps can be manipulated to hold the top in the down configuration.

6. The automobile of claim 4, wherein the at least one roof bow defines respective opposed left and right ends and the body further includes:

at least one left roof bow support surface for supporting the left end of the at least one roof bow; and at least one right roof bow support surface for supporting the right end of the at least one roof bow.

7. The automobile of claim 6, further comprising at least one lip extending outwardly from at least one side of the automobile, the top portion defining at least one edge, the top portion further including at least one cord engaged with the at least one edge for tautly holding the at least one edge in engagement with the at least one lip.

* * * * *